United States Patent [19]
Tani

[11] Patent Number: 6,085,045
[45] Date of Patent: Jul. 4, 2000

[54] ADJUSTING MECHANISM FOR A FOCUSING PLATE

[75] Inventor: Tetsuro Tani, Tokyo, Japan

[73] Assignee: Asahi Kogaku Kogyo Kabushiki Kaisha, Tokyo, Japan

[21] Appl. No.: 09/095,938

[22] Filed: Jun. 12, 1998

[30] Foreign Application Priority Data

Jun. 13, 1997 [JP] Japan ................ 9-172988
Jun. 13, 1997 [JP] Japan ................ 9-172989

[51] Int. Cl.[7] .............. G03B 13/02; G03B 13/16
[52] U.S. Cl. .................. 396/148; 396/89; 396/373
[58] Field of Search ................ 396/89, 148, 150, 396/373, 147, 271, 351

[56] References Cited

U.S. PATENT DOCUMENTS

| | | | |
|---|---|---|---|
| 4,096,499 | 6/1978 | Taguchi et al. ............ | 396/351 |
| 4,615,602 | 10/1986 | Eguchi ............ | 396/271 |
| 4,693,577 | 9/1987 | Sasagaki et al. ............ | 396/373 |
| 5,983,029 | 11/1999 | Yamada et al. ............ | 396/147 |

*Primary Examiner*—Russell Adams
*Attorney, Agent, or Firm*—Greenblum & Bernstein, P.L.C.

[57] ABSTRACT

A focusing plate adjusting mechanism includes a focusing plate which is detachably attached to a camera body and on which an object image is formed, an adjusting frame which is adapted to adjust the axial position of the focusing plate, a biasing spring which presses the focusing plate against the adjusting frame, and at least one holder which is moved in association with the adjusting frame when the focusing plate is not attached and which presses the focusing plate toward the adjusting frame through the biasing spring when the focusing plate is attached to the camera body.

20 Claims, 9 Drawing Sheets

ADJUSTING MECHANISM FOR A FOCUSING PLATE

BACKGROUND OF THE INVENTION

1. Field of the Invention

The present invention relates to an adjusting mechanism for a focusing plate which is adapted to adjust the position of a focusing plate in a single lens reflex camera.

2. Description of the Related Art

In a single lens reflex camera, object image carrying light transmitted through a photographing lens and reflected by a quick return mirror is converged onto a focusing plate to form an object image which can be viewed through a pentagonal prism (or pentagonal mirror) and an ocular (eyepiece) system.

The focusing plate can be provided with an indicia (indication area) which represents a predetermined area on the image surface, such as a photometering area or an object distance measuring area, etc. The indicia can be viewed through the view finder for example when a composition is determined.

The focusing plate must be placed in a position which is optically conjugate with the film surface. To this end, a focusing mechanism is provided to adjust the position of the focusing plate in the optical axis direction.

It is known for a camera to have an interchangeable focusing plate incorporated to vary a pattern of the indication area. It is also known for a camera to have an adjusting mechanism to adjust the position of the focusing plate in the optical axis direction and a support mechanism which detachably holds the focusing plate are provided. However, since the adjusting mechanism and the support mechanism are independent from one another, the focusing plate cannot be always stably held. Moreover, it is difficult to attach or detach the focusing plate at a certain adjusted position of the focusing plate.

A known focusing plate adjusting mechanism and attaching/detaching mechanism will be discussed below with reference to FIGS. 8 through 10.

Figure 10:
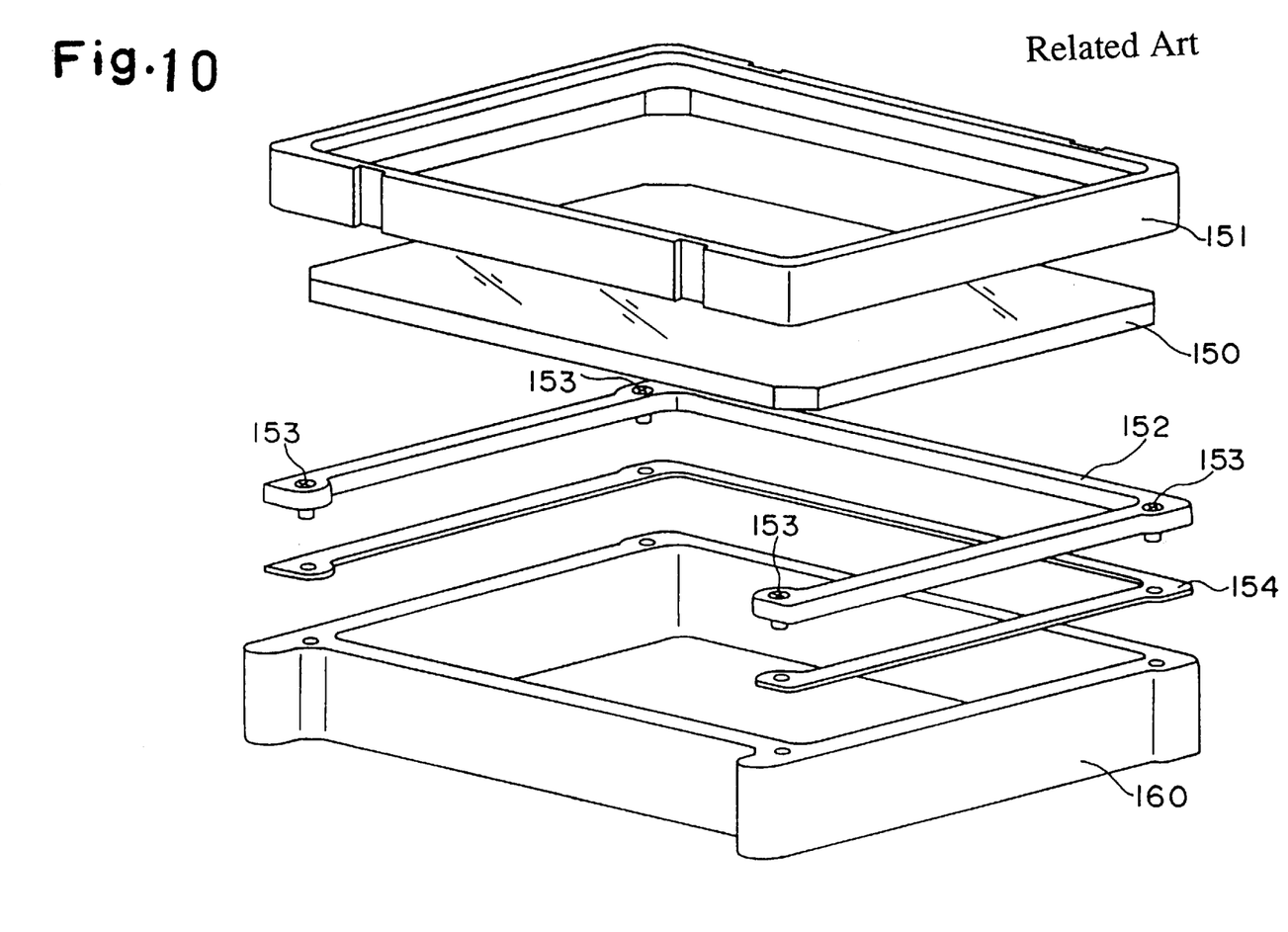

As can be seen in FIG. 10, the focusing plate 150 is generally rectangular and is pressed at the three sides thereof onto an upper surface of a generally U-shaped adjusting frame 152 by means of a focusing plate support frame 151.

The adjusting frame 152 is secured at the four corners thereof to a camera body 160 by means of set screws 153. A predetermined thickness of spacer 154 is inserted between the adjusting frame 152 and the camera body 160. The thickness of the spacer 154 is appropriately selected to adjust the position of the focusing plate 150 in the optical axis direction.

Figure 8:
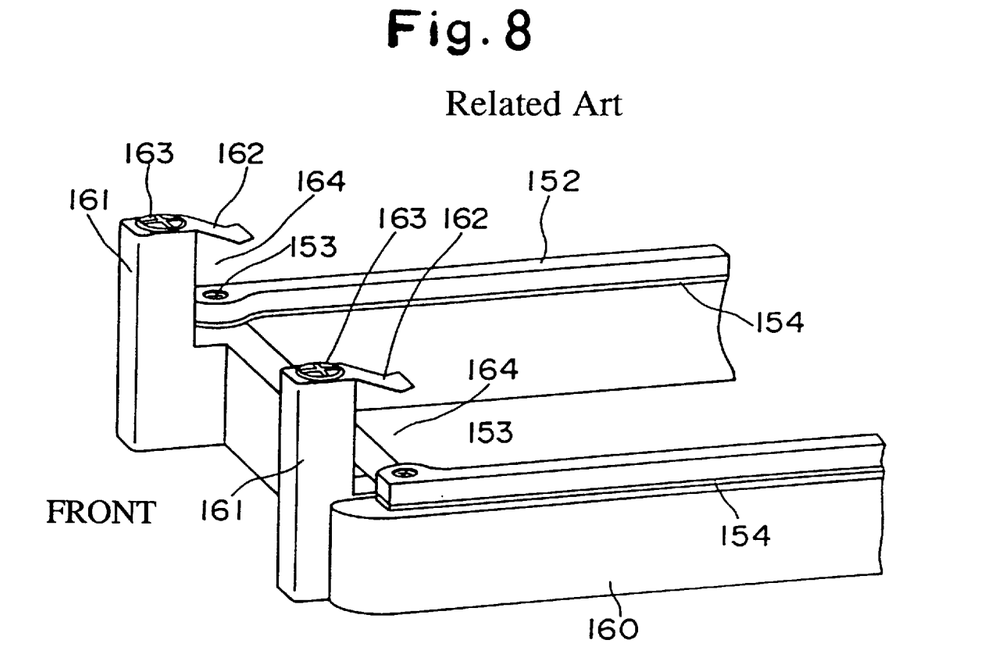
FIG. 8 is a perspective view of a known adjusting mechanism for a focusing plate when no focusing plate is attached.
Figure 9:
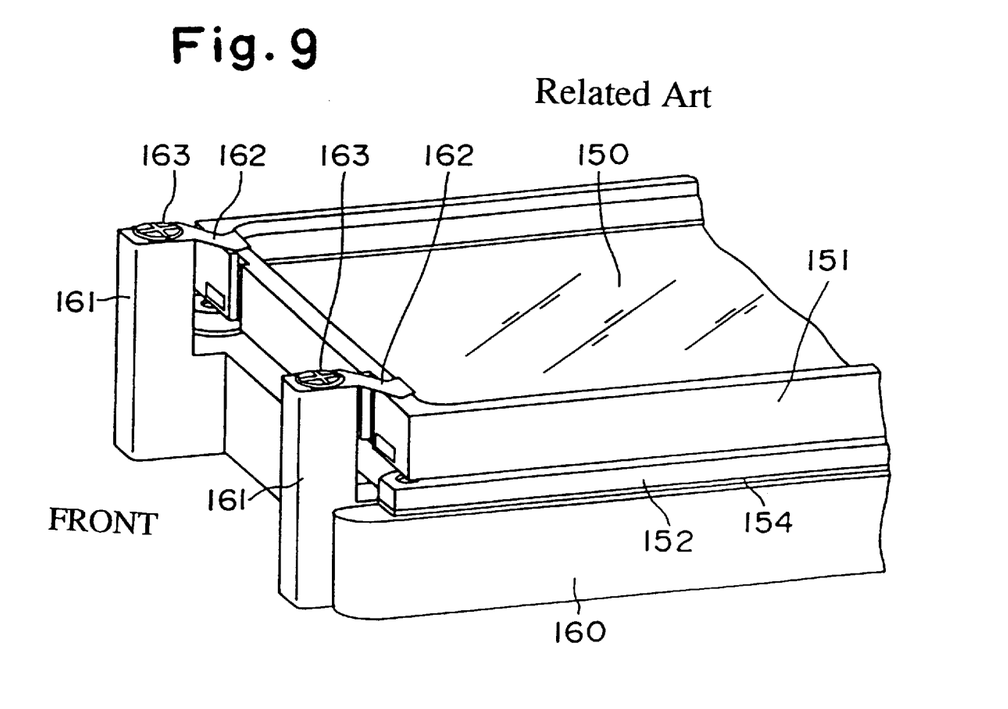
FIG. 9 is perspective view of a known adjusting mechanism for a focusing plate when the focusing plate is attached; and, FIG. 10 is an exploded perspective view of a known adjusting mechanism for a focusing plate.

The camera body 160 is provided at the front end thereof with a pair of posts 161 which are in turn provided on the upper ends thereof with leaf springs 162 secured thereto by means of set screws 163, as may be seen in FIGS. 8 and 9.

When the focusing plate 150 is attached to the camera body, the focusing plate support frame 151 is moved and pressed forward so that the upper surface of the front end of the support frame 151 abuts against the lower surfaces of the leaf springs 162. Consequently, the support frame 151 is biased downward by the leaf springs 162, so that the edge of the lower surface of the focusing plate 150 is pressed onto and firmly supported by the upper surface of the adjusting frame 152.

Namely, the focusing plate support frame 151 is inserted at its front end in a gap 164 defined between the leaf springs 162 and the adjusting frame 152. The gap 164 (i.e., the distance between the leaf springs 162 and the front end of the adjusting frame 152) varies depending on the axial position of the adjusting frame 152. Specifically, if a thick spacer 154 is used, the axial length of the gap 164 is reduced. Conversely, if a thin spacer 154 is used, the axial length of the gap 164 is increased.

If the gap 164 is small, it is difficult to insert the front end of the support frame 151 between the leaf springs 162 and the front end of the support frame 152. Namely, the attachment of the focusing plate 150 is made difficult. If the gap 164 is large, the spring force of the leaf springs 162 to press the focusing plate 150 onto the adjusting frame 152 is insufficient, so that it is impossible to stably or firmly hold the focusing plate 150.

Since the adjustment of the axial position of the focusing plate 150 is carried out by changing the thickness of the spacer 154 (exchanging the spacers having different thicknesses), the focusing plate 150 can be translated in the axial direction only. Namely, for example, no fine adjustment of the inclination angle of the focusing plate 150 with respect to the optical axis can be carried out.

Moreover, since the almost entire upper surface of the adjusting frame 152 is in surface contact with the lower surface of the focusing plate 150, if the adjusting frame 152 is distorted, i.e. does not lie on a flat plane, the focusing plate 150 cannot be stably held and there is an error of the adjusted position.

SUMMARY OF THE INVENTION

It is an object of the present invention to provide an adjusting mechanism for a focusing plate in which not only can the focusing plate be stably held and secured, but also the attachment and detachment of the focusing plate can be easily carried out.

Another object of the present invention is to provide an adjusting mechanism for a focusing plate in which not only can the focusing plate be firmly held, but also a fine adjustment of the position or posture of the focusing plate can be effected.

To achieve the above-mentioned objects there is provided, according to the present invention, a focusing plate adjusting mechanism for a single lens reflex camera constituting: a focusing plate, on which an object image is formed, that is detachably attached to a camera body; an adjusting frame which is adapted to adjust the axial position of the focusing plate; and a biasing member for pressing the focusing plate against the adjusting frame. The biasing member is provided with at least one holder which is moved in association with the adjusting frame when no focusing plate is attached and the holder presses the focusing plate toward the adjusting frame when the focusing plate is attached to the camera body. Preferably, the holder is provided with a first engaging portion which engages with an end of the focusing plate support frame when the focusing plate is attached to the camera body and a second engaging portion which engages with the adjusting frame when the focusing plate is detached.

According to another aspect of the present invention there is provided a focusing plate adjusting mechanism for a single lens reflex camera constituiting: a focusing plate, on which an object image is formed, that is detachably attached to a camera body; a focusing plate support frame which supports the focusing plate; an adjusting frame which abuts against the focusing plate to adjust the axial position of the focusing plate; and a biasing member for pressing the focusing plate against the adjusting frame. The biasing member is provided with at least one holder which is moved in association with the adjustment of the adjusting frame when the focusing plate is not attached, and the holder engages with the focusing plate support frame to press the focusing plate support frame toward the adjusting frame when the focusing plate is attached to the camera body. Preferably the holder is provided with a first engaging portion which engages with an end of the focusing plate support frame when the focusing plate is attached to the camera body and a second engaging portion which engages with the adjusting frame when the focusing plate is detached.

According to another aspect of the present invention there is provided a focusing plate adjusting mechanism for a single lens reflex camera constituting: a focusing plate, on which an object image is formed, that is detachably attached to a camera body; a focusing plate support frame which supports the focusing plate; an adjusting frame which abuts against the focusing plate to adjust the axial position of the focusing plate; and a biasing member for pressing the focusing plate against the adjusting frame. The biasing member includes: at least one holder which is moved in association with the adjustment of the adjusting frame when the focusing plate is not attached, the holder engages with the focusing plate support frame to press the focusing plate support frame toward the adjusting frame when the focusing plate is attached to the camera body; and a guide member which restricts the moving direction of the holder. Preferably, the guide member includes a guide rod which is secured to the camera body; the guide member having a flange. The biasing member includes a spring which is inserted between the flange and the holder in which the guide rod is inserted. Preferably, the holder is provided with a first engaging portion which engages with an end of the focusing plate support frame when the focusing plate is attached to the camera body and a second engaging portion which engages with the adjusting frame when the focusing plate is not attached.

Preferably, the biasing member biases the end of the focusing plate located away from the holder.

Preferably, the adjusting frame is provided, on the side thereof adjacent to the focusing plate, with three projections which are not aligned on a line so as to support the focusing plate at three points.

Preferably, the adjusting frame is secured to the camera body at four positions so as to adjust the axial position of the adjusting frame. Preferably, the adjusting frame is secured to the camera body by a pair of screw members provided at four corners of the adjusting frame, one of said pair of screw members being screw engaged with the adjusting frame and abutting the camera body, and the other of said pair of screw members being inserted to a through hole of the adjusting frame and being screw engaged with the camera body.

According to another aspect of the present invention there is also provided a focusing plate adjusting mechanism for a single lens reflex camera including: a focusing plate on which an object image is formed; and an adjusting frame which is placed in the vicinity of an outer periphery of the focusing plate. The focusing plate is attached to a camera body through the adjusting frame. The adjusting frame is provided on its one surface with three projections which are not aligned on a line to support the focusing plate at three points; and the adjusting frame is secured to the camera body so as to adjust the axial position thereof at four points.

According to another aspect of the present invention there is also provided a focusing plate adjusting mechanism for a single lens reflex camera including: a generally rectangular focusing plate on which an object image is formed; and an adjusting frame which is placed in the vicinity of an outer periphery of the focusing plate. The focusing plate being attached to a camera body through the adjusting frame. The adjusting frame is provided on its one surface with three projections which are not aligned on a line to support the focusing plate at three points; and the adjusting frame is secured to the camera body so as to independently adjust the axial position thereof at four points near the corners of the rectangular focusing plate. Preferably, the focusing plate adjusting mechanism further includes a biasing member for pressing the focusing plate against the adjusting frame. Preferably, the adjusting frame is provided with a pair of first and second parallel bars opposed to each other and a third bar which connects one end of the first and second bars. Preferably, the projections are provided one for each of the first, second and third bars. Preferably, the four points at which the adjusting frame is secured to the camera body are located at opposite ends of the first bar and opposite ends of the second bar. Preferably, this focusing plate adjusting mechanism further includes four adjusting frame securing means, each having a pair of screw members which are adapted to secure the adjusting frame to the camera body. Preferably, one of the pair of screw members is screw engaged with the adjusting frame and abuts the camera body, and the other of said pair of screw members is inserted to a through hole of the adjusting frame and is screw engaged with the camera body. Preferably, the focusing plate is detachably attached to the camera body.

The present disclosure relates to subject matter contained in Japanese Patent Applications Nos. 9-172988 (filed on Jun. 13, 1997) and 9-172989 (filed on Jun. 13, 1997) which are expressly incorporated herein by reference in their entireties.

BRIEF DESCRIPTION OF THE DRAWINGS

The invention will be described below in detail with reference to the accompanying drawings in which.

DESCRIPTION OF THE PREFERRED EMBODIMENT

Figure 1:
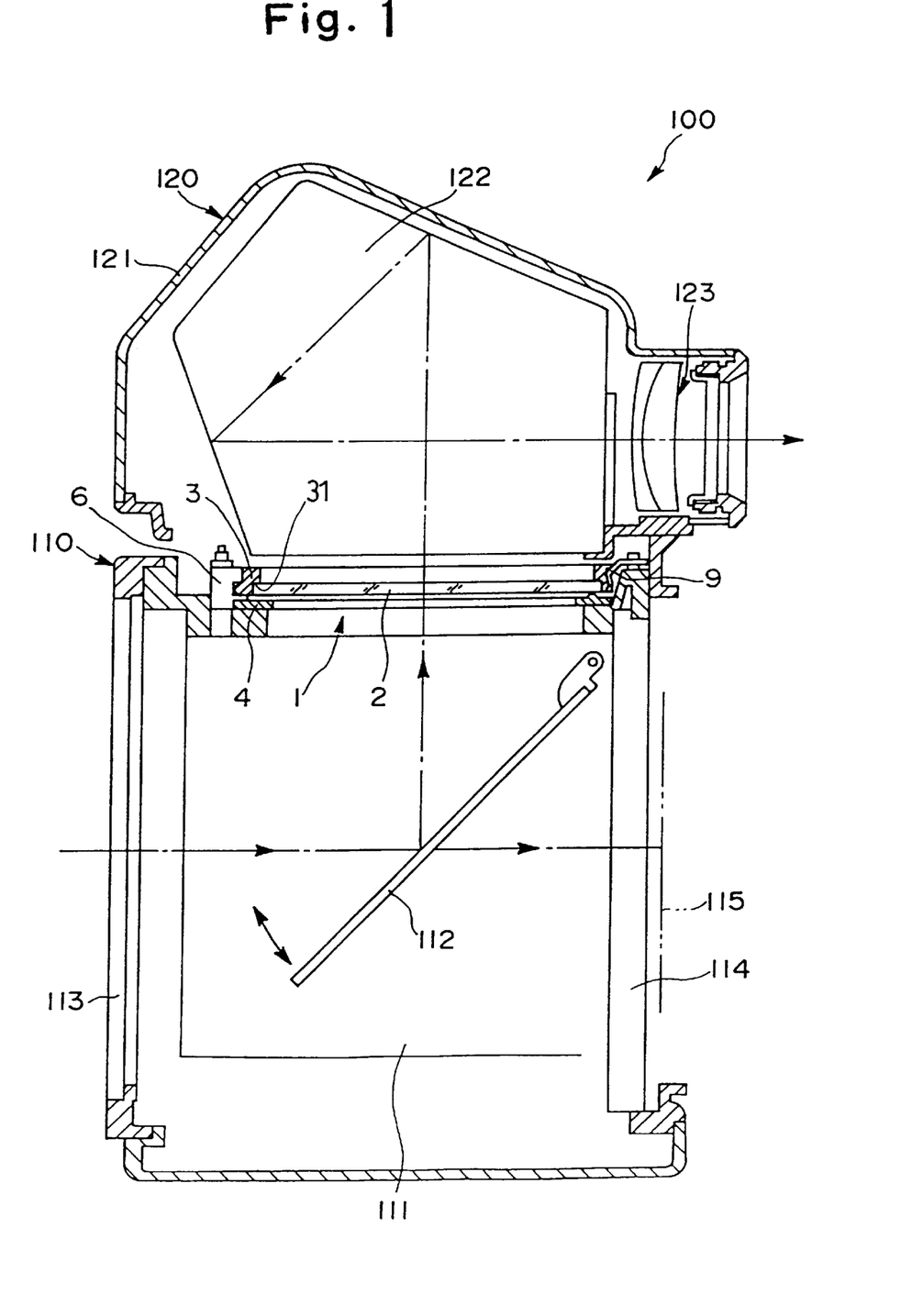
FIG. 1 is a side sectional view of a single lens reflex camera having an adjusting mechanism for a focusing plate incorporated therein, according to the present invention.

The camera 100 includes a camera body 110 and a view finder unit 120 which is detachably attached to the camera body 110, as shown in FIG. 1. The view finder unit 120 is composed of a casing 121, a pentagonal prism 122 housed in the casing 121, and an ocular system (eyepiece) 123. A mirror box 111 in which a quick return mirror 112 is rotatably provided in the camera body 110.

The camera body 110 is provided on the front end thereof with a mount 113 to which a photographing lens (not shown) can be attached. A shutter block 114 is provided behind the mirror box 111 in the camera body 110. A silver halide film 115 is placed behind the shutter block 114.

A focusing plate adjusting mechanism 1 (referred hereafter as an adjusting mechanism) according to the present invention is provided above the mirror box 111. The position of the focusing plate 2 is adjusted by the adjusting mechanism 1 so that the focusing plate 2 is located in a position which is optically equivalent with an emulsion layer of the silver halide film 115.

In a normal state (upon observation), object image carrying light incident upon the mirror box 111 through the photographing lens attached to the mount 113 and reflected by the quick return mirror 112 is converged onto the focusing plate 2 to form an object image thereon. The object image can be viewed as an erect image through the pentagonal prism 122 and the eyepiece system 123.

Upon photographing, the quick return mirror 112 is moved upward and the shutter block 114 operates to open the shutter for a predetermined period of time, so that the object image is formed and exposed on the emulsion layer of the silver halide film 115 through the photographing lens.

The structure of the adjusting mechanism will be explained below with reference to FIGS. 2 through 7. Note that in the following discussion, the directions identified as "upward", "downward", "front (forward)" and "rear (backward)" correspond to the top, bottom, left and right sides of, in FIGS. 2–4 and 7, respectively.

The adjusting mechanism 1 is composed of a focusing plate support frame 3 which supports the focusing plate 2, an adjusting frame 4, an adjusting frame securing means 5 which secures the adjusting frame 4 to the camera body 110, a pair of holders 6 and coil springs 7, guide rods 8 which are inserted in the holders 6 and the coil springs 7, and a leaf spring 9 which biases the focusing plate support frame 3 forward and downward. The focusing plate 2 can be replaced (interchanged) together with the focusing plate support frame 3. The replacement (attachment/detachment) of the focusing plate 2 is carried out after removing the finder unit 120 from the camera body 110.

Figure 5:
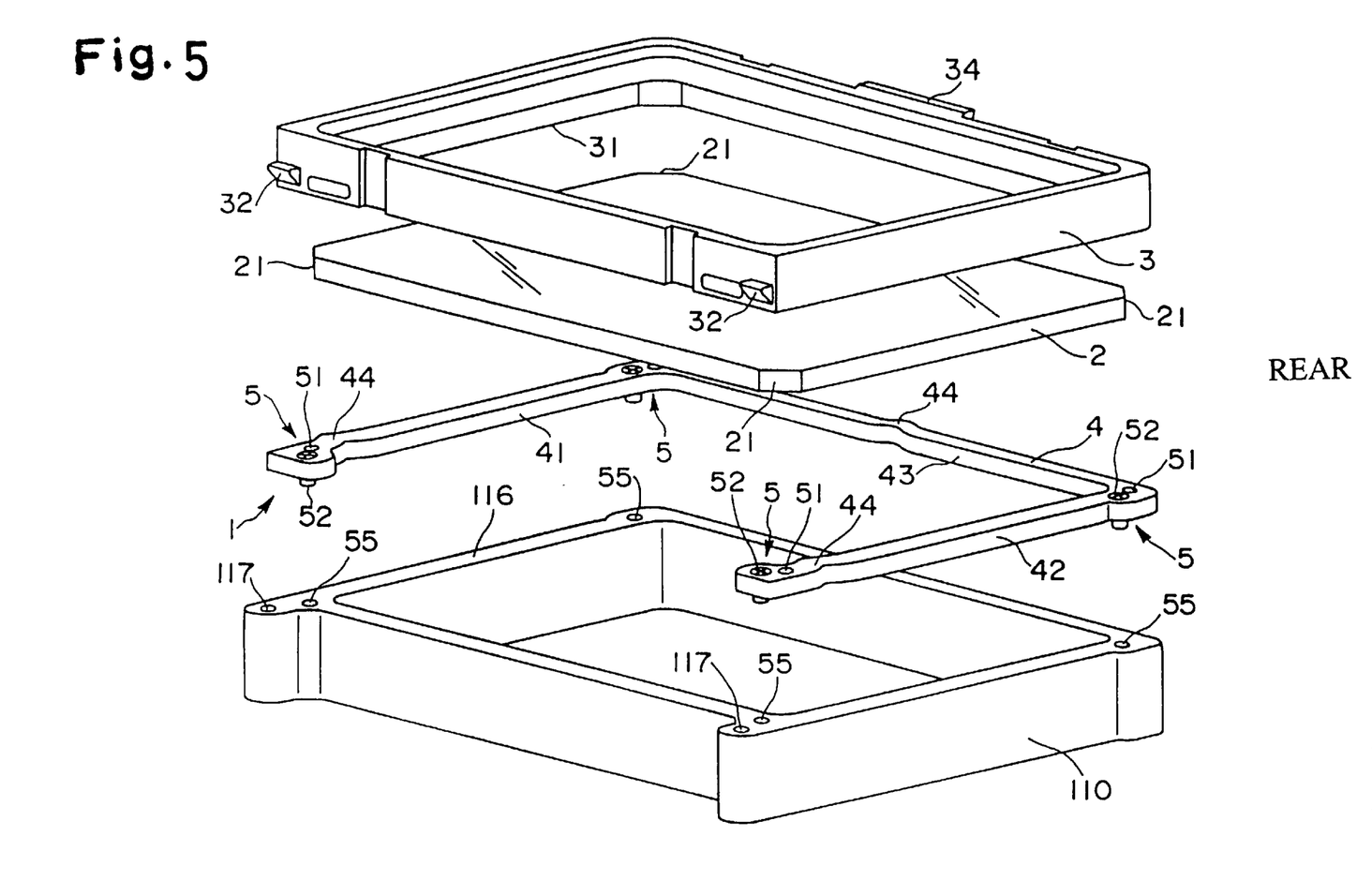
FIG. 5 is an exploded perspective view of an adjusting mechanism for a focusing plate according to the present invention.

As can be seen in FIG. 5, the focusing plate 2 is usually made of a glass or plastic plate which has a rough image forming surface. The focusing plate 2 is generally rectangular and is chamfered at four corners 21.

Within the focusing plate support frame 3, a stepped portion 31 is provided; the inner diameter of the rectangular lower portion of the focusing plate 2 with respect to the stepped portion 31 is larger than that of the rectangular upper portion thereof, so that the focusing plate 2 can be fitted or received and secured in the lower portion. The focusing plate support frame 3 is biased downward by means of a biasing member which will be discussed hereinafter. Consequently, the focusing plate 2 engages at the peripheral edge of the upper surface thereof with the stepped portion 31 and is pressed onto the adjusting frame 4.

The focusing plate support frame 3 is provided on the rear and upper end thereof with a handle 34 which can be held by an operator when the focusing plate support frame 3 is attached or detached.

The adjusting frame 4 is placed on the peripheral edge of the lower surface of the focusing plate 2 so as not to interrupt the effective light path. The adjusting frame 4 has a generally U-shape and is composed of a pair of parallel first and second bars 41 and 42 opposed to each other, and a third bar 4 which connects the rear ends of the first and second bars 41 and 42.

The first and second bars 41 and 42 are provided, on the upper surfaces of the front ends thereof, with projections 44. Likewise, the third bar 43 is provided on the upper surface of the intermediate portion thereof with a projection 44. The three projections 44 define an imaginary triangle in a plan view and abut against the circumferential edge portion of the focusing plate 2 to firmly hold the latter at three points. Namely, the focusing plate 2 is held at three points which are distributed in a same plane but are not aligned on a line, so that the flatness of the focusing plate 2, i.e., the position of the image forming surface, can be determined.

In the illustrated embodiment, each of the first, second and third bars 41, 42 and 43 of the adjusting frame 4 is provided with one projection 44, and hence the projections 44 are appropriately distributed without being concentrated in one place, so that the focusing plate 2 can be stably and firmly held.

Note that the projections 44 are formed by bending parts of the first, second and third bars 41, 42 and 43 upward in the illustrated embodiment. Thus, the formation of the projections 44 of the adjusting frame 4 can be facilitated. The shape of the projections 44 is not limited to that shown in the drawings. For example, the projections 44 can be made of pins or the like provided on the upper surface of the adjusting frame 4.

The adjusting frame 4 is secured to the camera body 110 at the four corners, i.e., the opposed ends of the first and second bars 41 and 42 by means of the adjusting frame securing means 5. Each adjusting frame securing means 5 is composed of a screw (set screw) which can be adapted to adjust the axial position (in the upward-downward direction) of the adjusting frame 4 at the four corners thereof by the adjustment of the screws. The identical adjusting means 5 will be described below, referring to FIG. 6.

Figure 6:
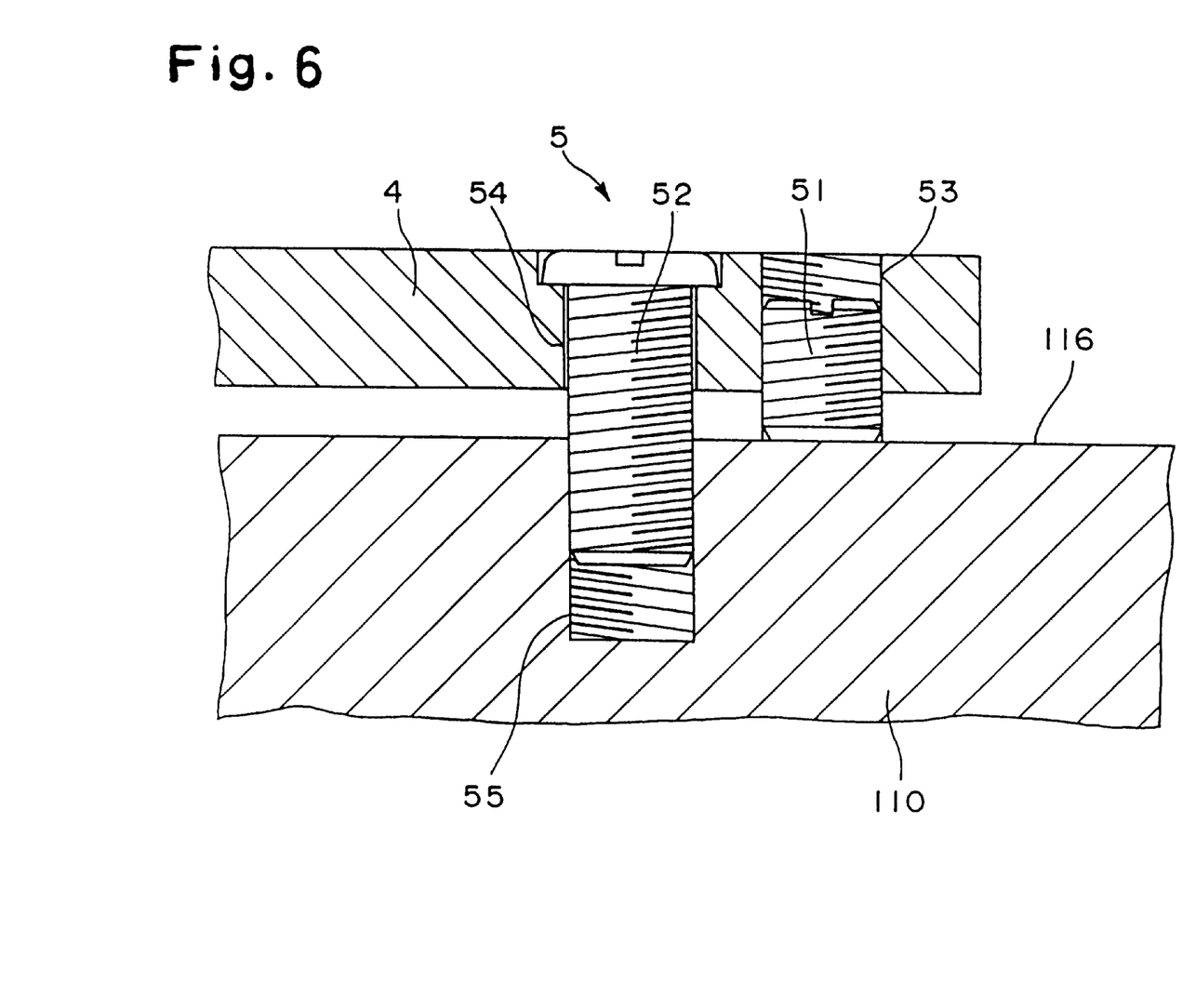
FIG. 6 is an enlarged sectional view of an adjusting frame securing means.

The adjusting frame 4 is equipped with threaded holes 53 in which the set screws 51 are screwed and through holes 54 in which screws 52 are inserted. The lower ends of the set screws 51 abut against an abutment surface 116 of the camera body 110. The lower ends of the screws 52 extend is from the lower surface of the adjusting frame 4 and are screwed in corresponding threaded holes 55 formed in the camera body 110.

Figure 4:
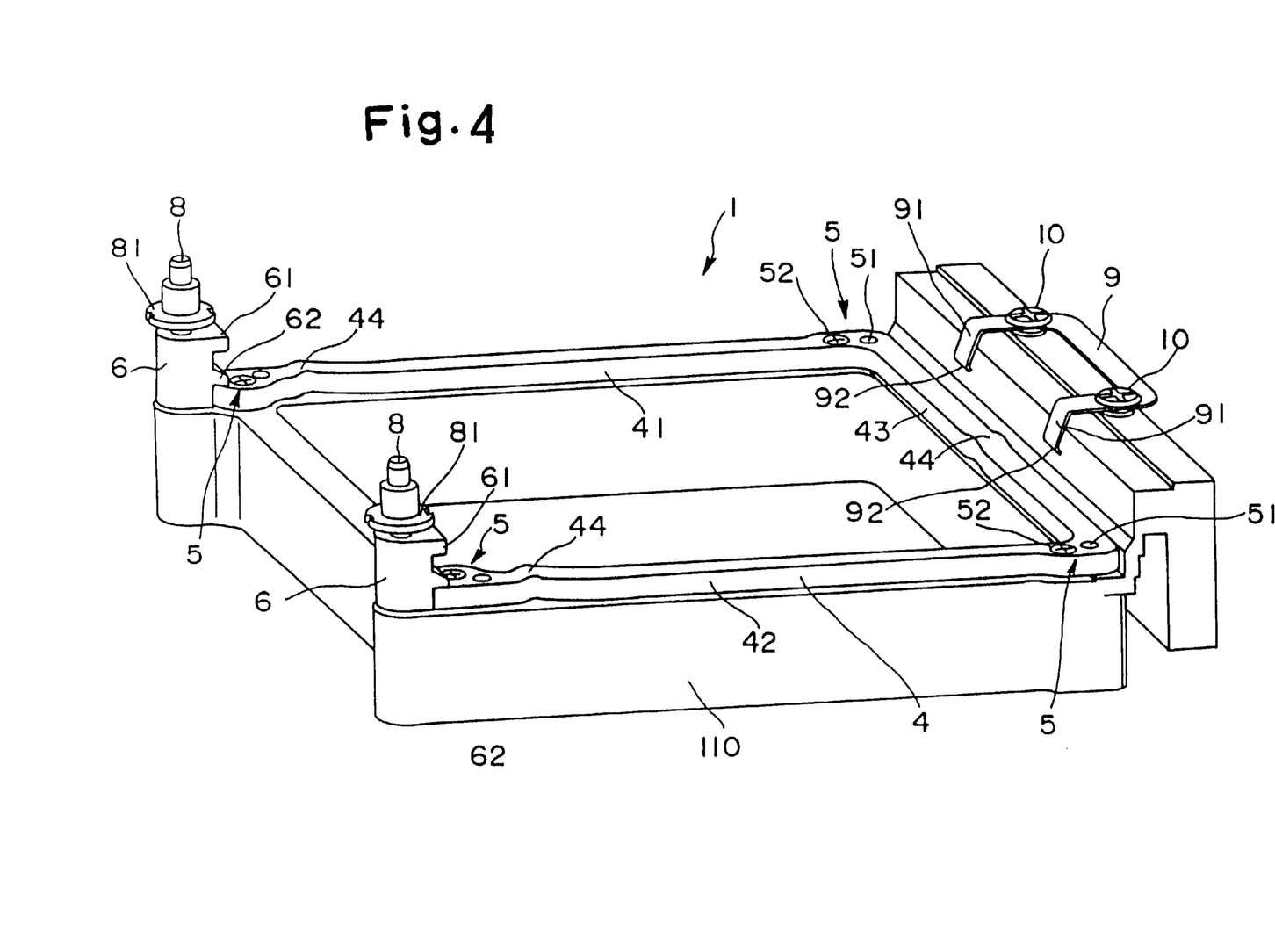
FIG. 4 is a perspective view of an adjusting mechanism for a focusing plate when no focusing plate is attached thereto, according to the present invention.

The adjustment by the adjusting frame securing means 5 is carried out after removing the focusing plate support frame 3 and the focusing plate 2 supported thereby from the camera body 110 as shown in FIG. 4. First, the set screws 51 are rotated to adjust the length of the portion of the set screws 51 projecting from the lower surface of the adjusting frame 4. Consequently, the axial position of the adjusting frame 4 (in the upward-downward direction in FIG. 6), the distance of the adjusting frame 4 from the abutment surface 116 is adjusted. Thereafter, the screws 52 are fastened (in the direction to move to a deeper position in the threaded holes 55) to increase the contact pressure of the lower ends of the set screws 51 with the abutment surface 116.

Figure 2:
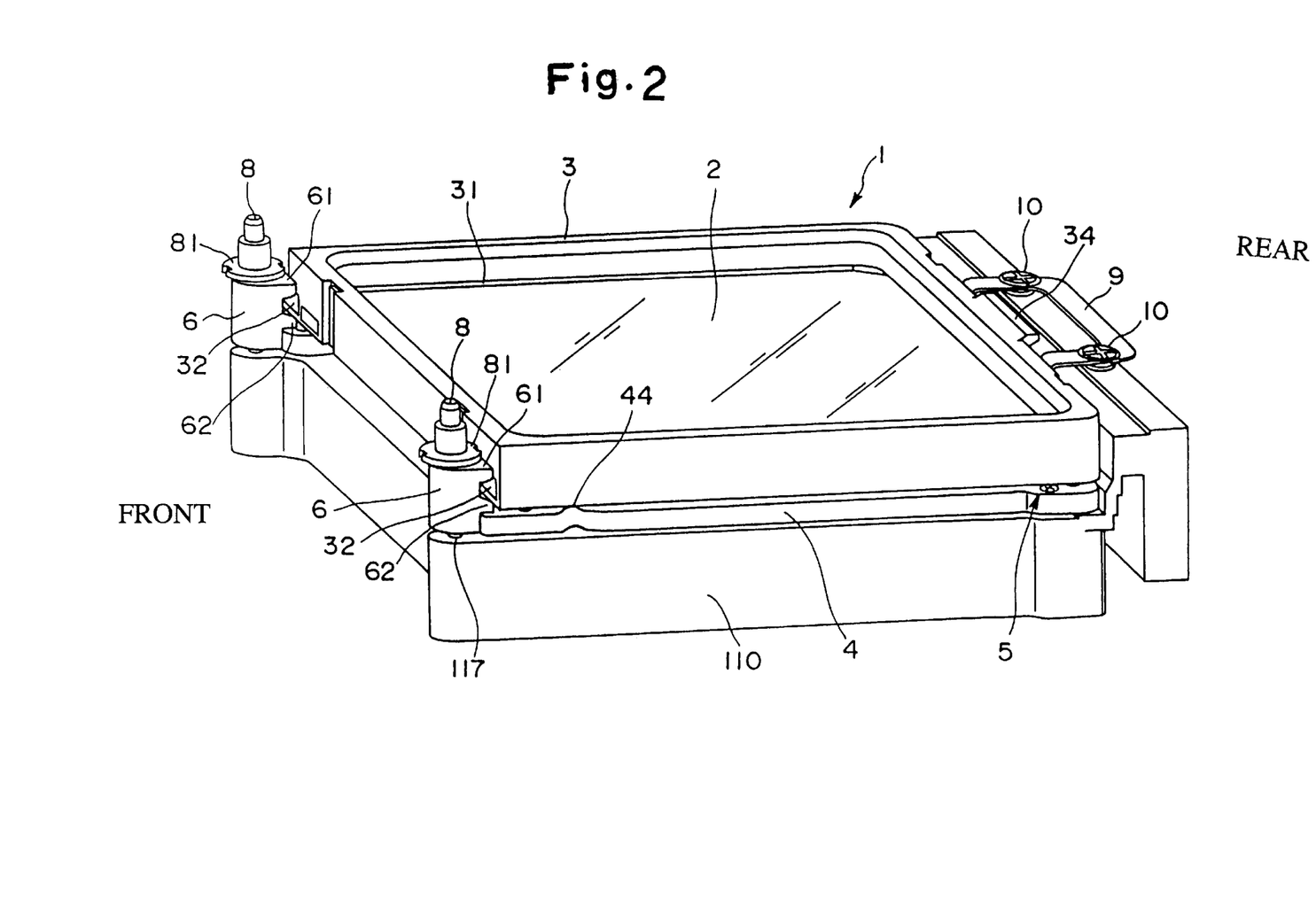
FIG. 2 is a perspective view of an adjusting mechanism for a focusing plate when the focusing plate is attached thereto, according to the present invention.

After the adjustment is carried out by each of the four adjusting frame securing means 5, the focusing plate support frame 3 which holds the focusing plate 2 is attached to the adjusting frame 4, as shown in FIG. 2. The attachment of the focusing plate support frame 3 is carried out by engaging projections (hooks) 32 provided on the front end of the focusing plate support frame 3 with first engaging portions 61 of the holders 6 and by thereafter moving downward the rear end of the focusing plate support frame 3 while applying an external force to the focusing plate support frame 3 in the forward direction. Consequently, bent portions 92 (FIG. 4) of the leaf spring 9 are pressed onto oblique surfaces 33 (FIG. 7) of the focusing plate support frame 3. Note that when the focusing plate support frame 3 is detached from the camera body, the operations are performed in the way opposite to that for the attachment thereof.

When the focusing plate support frame 3 is attached, the focusing plate 2 is biased toward the adjusting frame 4 and are held at three points by the projections 44.

Since the adjustments of the axial position of the adjusting frame 4 by the adjusting frame securing means 5 are carried out independently, it is possible not only to translate the entire adjusting frame 4 but also to finely adjust the inclination angle of the adjusting frame 4 with respect to the optical axis. For instance, the first bar 41 is moved to a lower position than the second bar 42 to incline the third bar 43, or the third bar 44 is moved upward to incline the first and second bars 41 and 42. It is also possible to carry out the adjustment of the above-mentioned inclination operations in combination. Thus, by the adjustments of the adjusting fame 4 mentioned above, the focusing plate 2 which is held by the adjusting frame 4 is also adjusted.

In the illustrated embodiment, since the adjusting frame securing means 5 are provided at the four corners of the adjusting frame 4, the above-mentioned adjustments, and in particular, the fine adjustment of the inclination angle of the focusing plate 2 with respect to the optical axis can be easily and accurately executed. Moreover, since the adjusting frame securing means 5 are each comprised of a pair of screws, the adjustment can be extremely easily carried out.

The focusing plate support frame 3 is biased downward at the front and rear portions thereof by the biasing member. The structure of the biasing member will be discussed below.

Figure 3:
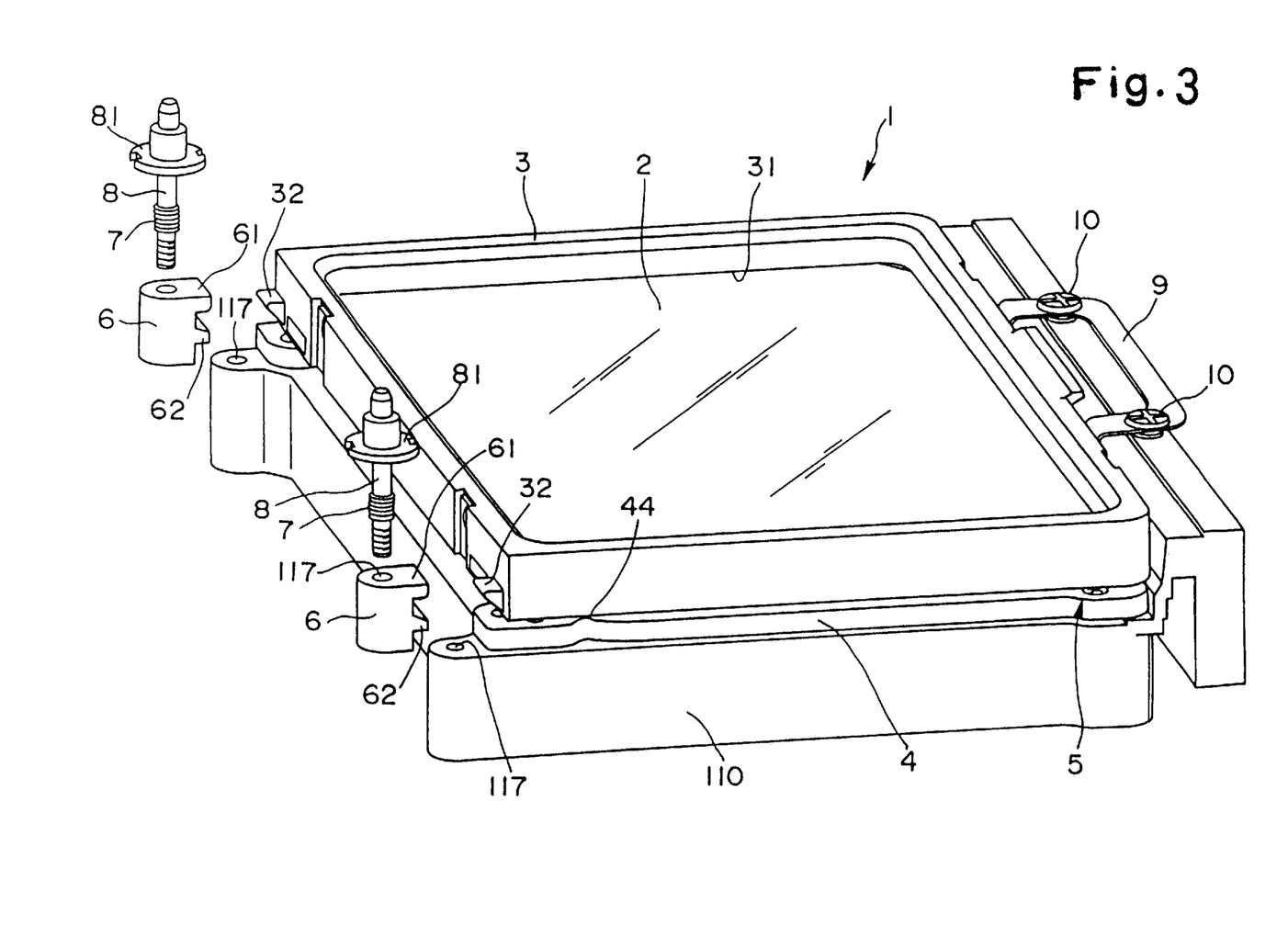
FIG. 3 is a perspective view of an adjusting mechanism for a focusing plate when the focusing plate is attached thereto, according to the present invention.

As may be seen in FIGS. 2 through 4, the camera body 110 is provided on the front end thereof with a pair of threaded holes 117 in which the lower ends of the guide rods 8 are screwed and secured. Each guide rod 8 is inserted in the holders 6 and the coil spring (biasing member) 7. The coil springs 7 are compressed between flanges 81 formed on the upper ends of the guide rods 8 and the upper surfaces of the holders 6 to bias the holders 6 downward. The holders 6 can be moved up and down along the guide rods 8 against the coil springs 7.

The holders 6 are each provided with a first upper engaging portion 61 and a second lower engaging portion 62.

The engaging portions 61 and 62 project backward.

The focusing plate support frame 3 is equipped on the front end thereof with a pair of projections (hooks) 32 that are respectively engaged by the corresponding first engaging portions 61 of the holders 6. Consequently, the spring force of the coil springs 7 is transmitted to the focusing plate support frame 3 through the first engaging portions 61 of the holders 6 and the projections 32 that engage therewith, so that the front portion of the focusing plate support frame 3 is biased downward.

When the focusing plate support frame 3 is attached, the second engaging portions 62 of the holders 6 are located in the vicinity of or in contact with the upper surface of the front end of the adjusting frame 4. When the focusing plate support frame 3 is detached, the second engaging portions 62 engage with the upper surface of the front end of the adjusting frame 4 to thereby restrict the downward movement of the holders 6 (FIG. 4).

As can be understood from the foregoing, when focusing plate support frame 3 is not attached, the second engaging portions 62 abut against the upper surface of the front end of the adjusting frame 4 to restrict the downward movement of the holders 6, and hence the holders 6 are moved up and down together with the adjusting frame 4 when the holders 6 move up and down. Consequently, the first engaging portions 61 are always spaced from the upper surface of the adjusting frame 4 at a constant distance, regardless of the adjustment of the adjusting frame 4 with respect to the camera body 110. Therefore, the biasing force of the coil springs 7 exerted on the focusing plate support frame 3 through the holders 6 is always kept constant during the adjustment of the adjusting frame 4, so that the focusing plate 2 can be stably and firmly held and secured. In particular, this effect is enhanced when combined with the effect of the three-point support of the focusing plate 2.

Since the first engaging portions 61 are always spaced from the upper surface of the adjusting frame 4 at a constant distance, regardless of the axial position of the adjusting frame 4, the projections 32 can be easily and firmly engaged by the first engaging portions 61 when the focusing plate support frame 3 is attached.

The camera body 110 is provided with the leaf spring (biasing member) 9 secured thereto by screws 10 and located in rear of the focusing plate support frame 3, as mentioned above. As may be seen in FIG. 7, the focusing plate support frame 3 is provided on the rear end thereof with the oblique surface 33. The leaf spring 9 is provided with a horizontal portion secured to the camera body 110 and two bent pieces 91 that extend from the horizontal portion in the forward and downward direction. The bent pieces 91 are each provided on the front (lower) ends thereof with generally V-shaped bent ends 92 that abut against the oblique surface 33. Thus, the oblique surface 33 receives the spring force of the leaf spring 9 in the forward and downward direction.

Figure 7:
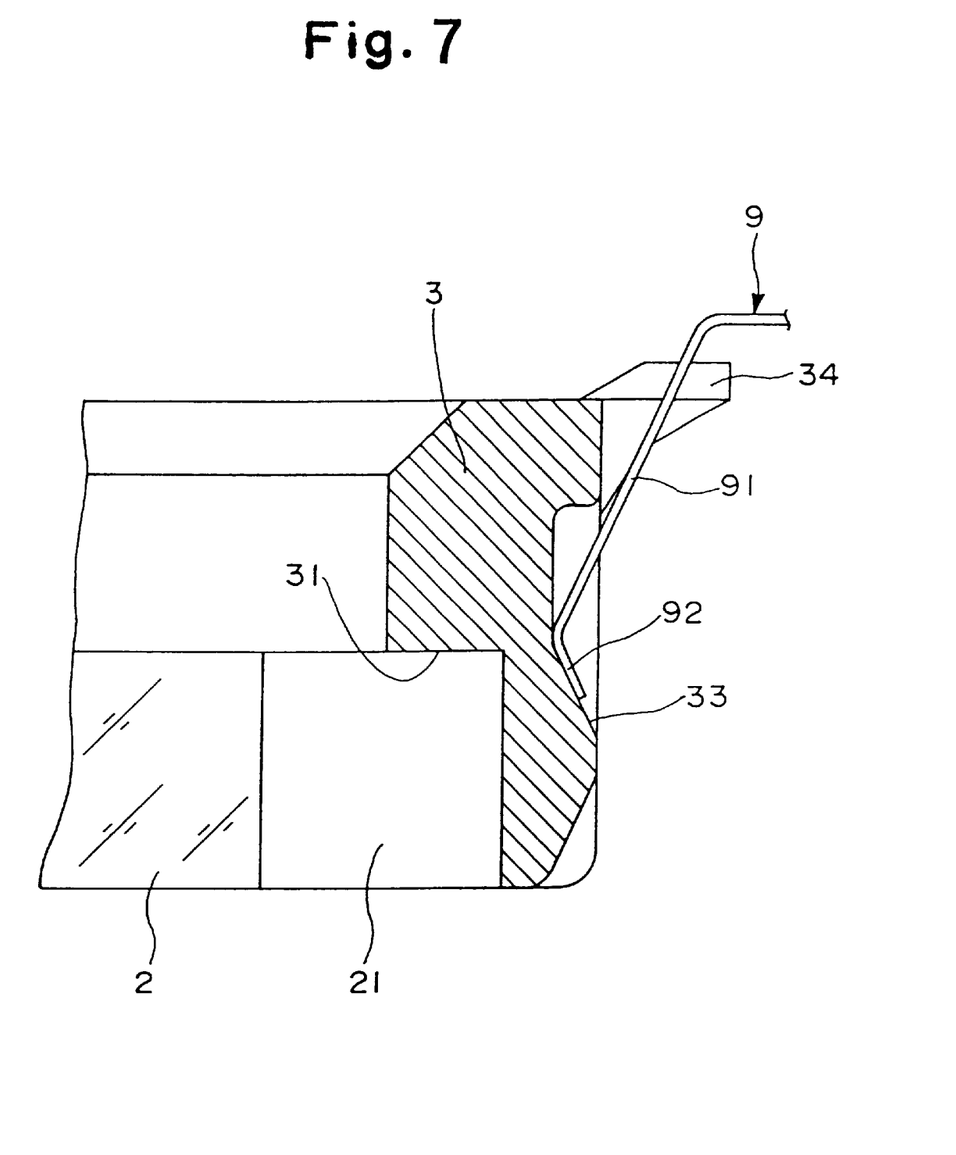
FIG. 7 is a side sectional view of a rear portion of a focusing plate support frame.

Consequently, the focusing plate support frame 3 is biased forward due to the biasing force of the leaf spring 9 and is also biased downward at the rear end thereof. Thus, the projections 32 of the focusing plate support frame 3 are certainly engaged by the first engaging portions 61 of the holders 6 due to the forward biasing force exerted on the focusing plate support frame 3.

The leaf spring 9 also functions to absorb the upward or downward displacement of the focusing plate support frame 3 produced during the adjustment by the adjusting frame 4, due to the elastic deformation of the bent pieces 91 or the sliding movement of the bent ends 92 on the oblique surface 33.

As may be seen from the foregoing, the front and rear portions of the focusing plate support frame 3 are biased downward, and hence the focusing plate 2 which is held on the lower surface of the focusing plate support frame 3 is also biased downward. Consequently, the lower surface of the focusing plate 2 is pressed at the circumferential edge thereof onto the three projections 44, so that the focusing plate 2 can be firmly held at three points.

The present invention is not limited to the illustrated embodiment. Each component in the illustrated embodiment can be replaced with an equivalent thereof having like function. In particular, the shape, structure, number or location, etc., of the holders which constitute the biasing member can be appropriately modified.

Also, the location of the projections of the adjusting frame or the position at which the adjusting frame is secured to the camera body is not limited to that in the illustrated embodiment. It is also possible to use a spacer similar to the spacer 154 in order to adjust the axial position of the adjusting frame in the upward/downward direction.

As can be understood from the above discussion, according to the present invention, the focusing plate can be stably and firmly held, regardless of the adjustment by the adjusting frame. Moreover, the attachment or detachment of the focusing plate can be easily and reliably carried out.

In an embodiment in which the focusing plate is supported by three projections, the focusing plate can be stably and firmly held at three points. In an embodiment in which the adjusting frame is secured to the camera body by means of four independent securing means, a fine adjustment of the position or posture of the focusing plate can be effected.

In particular, if a deformation of the adjusting frame, such as deflection or distortion, etc., occurs, the deformation can be compensated by the three-point support or the independent positional adjustments at four points, so that the focusing plate can be secured flat.

In addition to the foregoing, the adjustment can be easily and accurately carried out by the adjusting mechanism according to the present invention.

As can be understood from the above discussion, according to the present invention, since the focusing plate is supported by the three projections and is secured to the camera body after the axial position of the focusing plate is adjusted at four points, not only the focusing plate can be stably and firmly held and secured to the camera body, but also a fine adjustment of the position or flatness of the focusing plate can be carried out.

What is claimed is:

1. A focusing plate adjusting mechanism for a single lens reflex camera, comprising:
    a focusing plate, on which an object image is formed, that is detachably attached to a camera body;
    an adjusting frame which is adapted to adjust the axial position of said focusing plate; and
    a biasing member for pressing said focusing plate against said adjusting frame;
    wherein said biasing member is provided with at least one holder which is moved in association with the adjusting frame when no focusing plate is attached; and
    wherein said holder presses said focusing plate toward said adjusting frame when said focusing plate is attached to said camera body.

2. A focusing plate adjusting mechanism according to claim 1, wherein said holder is provided with a first engaging portion which engages with an end of the focusing plate support frame when said focusing plate is attached to said camera body and a second engaging portion which engages with said adjusting frame when said focusing plate is not attached.

3. A focusing plate adjusting mechanism for a single lens reflex camera, comprising:
    a focusing plate, on which an object image is formed, that is detachably attached to a camera body;
    a focusing plate support frame which supports said focusing plate;
    an adjusting frame which abuts against said focusing plate to adjust the axial position thereof; and
    a biasing member for pressing said focusing plate against said adjusting frame;
    wherein said biasing member is provided with at least one holder which is moved in association with the adjustment of said adjusting frame when said focusing plate is not attached, and
    wherein said holder engages with said focusing plate support frame to press said focusing plate support frame toward said adjusting frame when said focusing plate is attached to said camera body.

4. A focusing plate adjusting mechanism according to claim 3, wherein said holder is provided with a first engaging portion which engages with an end of said focusing plate support frame when said focusing plate is attached to said camera body and a second engaging portion which engages with said adjusting frame when said focusing plate is attached.

5. A focusing plate adjusting mechanism for a single lens reflex camera, comprising:
    a focusing plate, on which an object image is formed, that is detachably attached to a camera body;
    a focusing plate support frame which supports said focusing plate;
    an adjusting frame which abuts against said focusing plate to adjust the axial position thereof; and
    a biasing member for pressing said focusing plate against said adjusting frame;
    said biasing member comprising;
        at least one holder which is moved in association with the adjustment of said adjusting frame when said focusing plate is not attached, said holder engaging with said focusing plate support frame to press said focusing plate support frame toward said adjusting frame when said focusing plate is attached to said camera body; and
        a guide member which restricts the moving direction of said at least one holder.

6. A focusing plate adjusting mechanism according to claim 5, said guide member comprising a guide rod which is secured to said camera body, said guide member having a flange; said biasing member comprising a spring which is inserted between said flange and the holder in which the guide rod is inserted.

7. A focusing plate adjusting mechanism according to claim 5, wherein said holder is provided with a first engaging portion which engages with an end of said focusing plate support frame when said focusing plate is attached to said camera body and a second engaging portion which engages with said adjusting frame when said focusing plate is not attached.

8. A focusing plate adjusting mechanism according to claim 1, wherein said biasing member biases the end of said focusing plate located away from said holder.

9. A focusing plate adjusting mechanism according to claim 1, wherein said adjusting frame is provided, on the side thereof adjacent to said focusing plate, with three projections which are not aligned on a line so as to support said focusing plate at three points.

10. A focusing plate adjusting mechanism according to claim 1, wherein said adjusting frame is secured to said camera body at four positions so as to adjust the axial position of said adjusting frame.

11. A focusing plate adjusting mechanism according to claim 10, wherein said adjusting frame is secured to said camera body by a pair of screw members provided at four corners of said adjusting frame, one of said pair of screw members being screw engaged with said adjusting frame and abutting said camera body, and the other of said pair of screw members being inserted to a through hole of said adjusting frame and being screw engaged with said camera body.

12. A focusing plate adjusting mechanism for a single lens reflex camera, comprising;
   a focusing plate on which an object image is formed; and
   an adjusting frame which is placed in the vicinity of an outer periphery of said focusing plate;
   said focusing plate being attached to a camera body through said adjusting frame;
   wherein said adjusting frame is provided on its one surface with three projections which are not aligned on a line to support the focusing plate at three points; and
   wherein said adjusting frame is secured to said camera body so as to adjust the axial position thereof at four points.

13. A focusing plate adjusting mechanism for a single lens reflex camera, comprising;
   a generally rectangular focusing plate on which an object image is formed; and
   an adjusting frame which is placed in the vicinity of an outer periphery of said focusing plate;
   said focusing plate being attached to a camera body through said adjusting frame;
   wherein said adjusting frame is provided on its one surface with three projections which are not aligned on a line to support said focusing plate at three points; and
   wherein said adjusting frame is secured to said camera body so as to independently adjust the axial position thereof at four points near the corners of the rectangular focusing plate.

14. A focusing plate adjusting mechanism according to claim 13, further comprising a biasing member for pressing said focusing plate against said adjusting frame.

15. A focusing plate adjusting mechanism according to claim 13, wherein said adjusting frame is provided with a pair of first and second parallel bars opposed to each other and a third bar which connects one end of the first and second bars.

16. A focusing plate adjusting mechanism according to claim 15, wherein said projections are provided one for each of the first, second and third bars.

17. A focusing plate adjusting mechanism according to claim 15, wherein the four points at which the adjusting frame is secured to said camera body are located at opposite ends of the first bar and opposite ends of the second bar.

18. A focusing plate adjusting mechanism according to claim 13, further comprising four adjusting frame securing means, each having a pair of screw members which are adapted to secure said adjusting frame to said camera body.

19. A focusing plate adjusting mechanism according to claim 18, wherein one of said pair of screw members is screw engaged with said adjusting frame and abuts said camera body, and the other of said pair of screw members is inserted to a through hole of said adjusting frame and is screw engaged with said camera body.

20. A focusing plate adjusting mechanism according to claim 13, wherein said focusing plate is detachably attached to said camera body.

* * * * *